Patented May 6, 1930

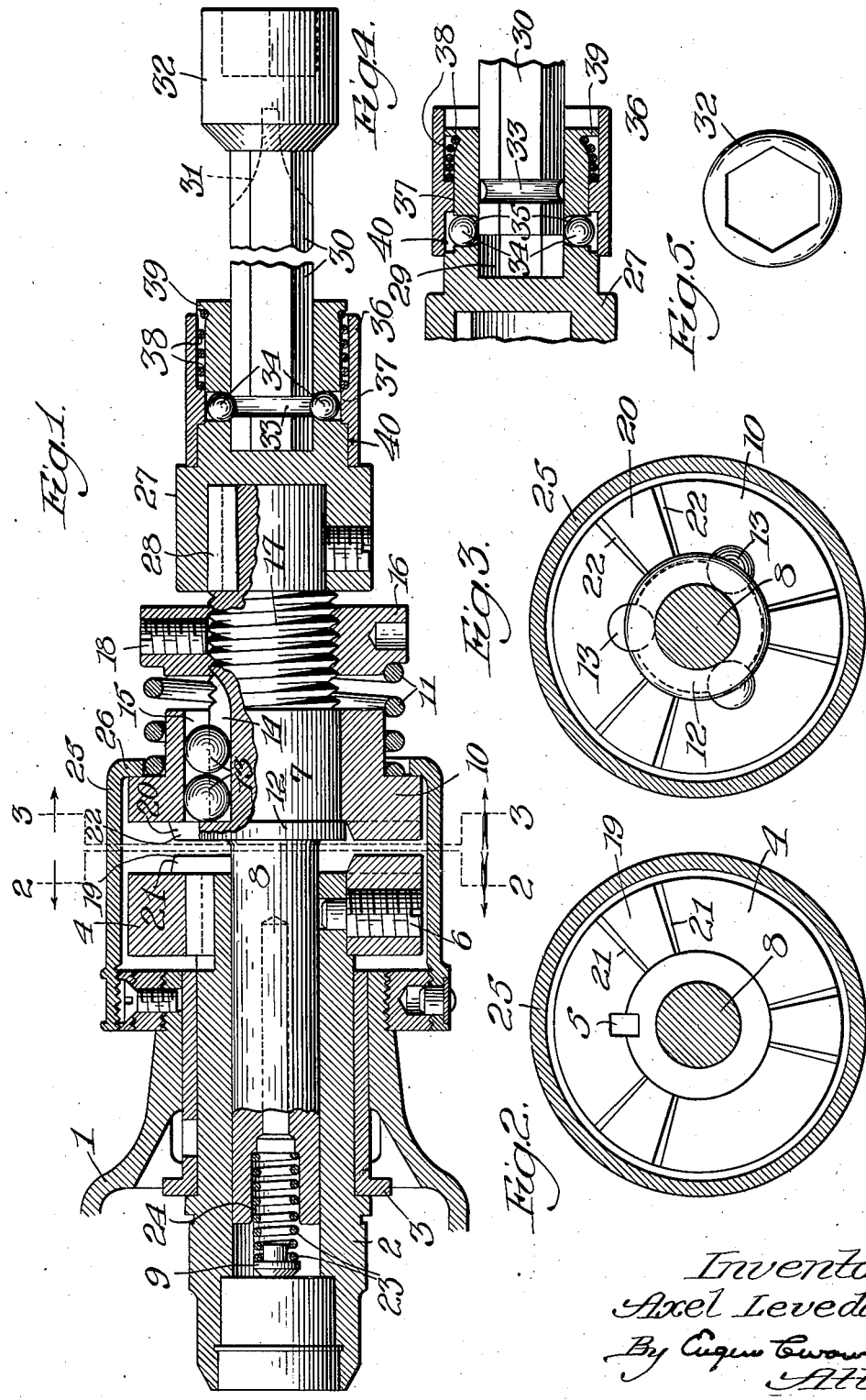

1,757,125

UNITED STATES PATENT OFFICE

AXEL LEVEDAHL, OF AURORA, ILLINOIS, ASSIGNOR TO INDEPENDENT PNEUMATIC TOOL COMPANY, OF CHICAGO, ILLINOIS, A CORPORATION OF DELAWARE

SCREW OR NUT DRIVING DEVICE FOR PORTABLE POWER-DRIVEN ROTARY TOOLS

Application filed September 23, 1927. Serial No. 221,603.

This invention relates to a screw or nut driving device for portable power driven rotary tools, such as drills, whereby screws and nuts may be set rapidly by power.

In my copending application Serial No. 221,602, filed September 23, 1927, I have disclosed and claimed a device for this purpose having three clutch members. These are arranged in axial alignment and increase the overall length as well as the expense of making the tools.

The object of my present invention is to provide a device having only two clutch members, thereby shortening the length of the tool and consequently making it less expensive.

The invention consists further in the matters hereinafter described and claimed.

In the accompanying drawings—

Fig. 1 is a longitudinal vertical sectional view through the device of my invention;

Figs. 2 and 3 are transverse vertical sectional views taken on lines 2—2 and 3—3, respectively, of Fig. 1;

Fig. 4 is a longitudinal vertical sectional view through the tool holder, showing how a shank is inserted in or removed therefrom; and Fig. 5 is an end view of the nut-engaging socket usable with said shank.

In Fig. 1, 1 indicates an extension of the tool casing at its forward end, and 2 indicates the rotary spindle of the tool journaled in said extension with a bearing bushing 3 between them. The spindle 2 is driven by the high speed motor of the tool through a reducing gear train (not shown) which connects the spindle with the shaft of the motor. The spindle 2 projects beyond the forward end of the extension 1 and there has a clutch member 4 which is applied over the outer end of the spindle and held thereon by a key 5 and a set screw 6.

The shaft 7 of the attachment is preferably made in one piece and extends forward of the spindle 2 and has its inner end portion 8 slidably and rotatably mounted in said spindle, the latter being made hollow, as at 9, so as to receive the end portion 8 of the shaft. A clutch member 10 is mounted on the shaft 7 beyond the clutch member 4. A relatively heavy coiled spring 11 is about the shaft forward of the clutch member 10 and normally holds the same against an annular shoulder 12 which is provided on the shaft between the clutch members 4 and 10, as shown. The shoulder 12 prevents the clutch member 10 from slipping off of the shaft in the direction of the tool proper.

The clutch member 10 is held from rotating with respect to the shaft 7 by three sets of ball keys 13, 13 located in registering grooves 14, 15 in the shaft 7 and clutch member 10, respectively, and extending lengthwise thereof. The sets of keys and their grooves are spaced apart about the shaft with the grooves 14 in the shaft extending beyond the forward end of the clutch member 10 so that the balls may be inserted in the grooves before the spring 11 and its tension adjusting nut 16 are applied to the shaft. When assembled, the nut 16 is close enough to the clutch member 10 to prevent the keys from working out of the grooves. The portion of the shaft 7 at the nut 16 is screw-threaded, as at 17, so that the nut may be adjusted endwise of the shaft to adjust the tension of the spring 11 and thus determine the torque at which the clutch members will slip with respect to each other to disconnect the driving torque of the spindle 2 from the shaft 7 during the use of the tool. The nut 16 is locked in its positions of adjustment by a set-screw 18 carried by the nut, as shown.

The clutch members 4 and 10 have co-operating clutch teeth or jaws 19, 20 on their opposed surfaces. These teeth are beyond the outer periphery of the shoulder 12 so that they may engage for connecting the shaft 7 to the spindle 2 on pressing the tool against the work. The teeth or jaws 19, 20 have inclined side faces 21, 22 so that the teeth will slip and ratchet over each other to disconnect the driving torque of the spindle 2 from the shaft 7 the instant that the screw or nut being driven by said shaft has been sufficiently tightened to be set. Three teeth or jaws 19, 20 are shown on each clutch member. This permits the making of wide spaces between the respective teeth so that the clutch members may be moved into complete engagement before the jaws take hold to turn the shaft 7 by the spindle 2. This is especially advantageous in large size tools which are heavy and require some little time to move the clutches into complete engagement. Thus no opportunity is afforded for the jaws to slip or ratchet over each other in the initial engagement of the clutches to set a screw or nut.

A coiled spring 23 seated in a recess 24 at the inner end of the shaft 7 bears against the closed end of the bore 9 in the spindle 2 and exerts a constant outward pressure on the shaft 7 to force it outward from the spindle and move the clutch members 4 and 10 apart to disconnect them on withdrawing the tool from the work, as well as normally holding said clutch members apart when the tool is not in use. To prevent the shaft 7 from working or dropping out of the spindle 2, I provide a guard 25 which may be in the form of a sleeve or cap secured to the extension 1 and extending over and housing the clutch members 4 and 10, as shown in Fig. 1. The cap or sleeve 25 has an inturned flange 26 at its outer end extending in front of the clutch member 10 and preventing it from leaving the sleeve. The opening in the flange 26 is large enough for the spring 11 to pass through and bear against the clutch member.

A tool holder 27 is secured to the forward end of the shaft 7 beyond the nut 16 by a key 28. The holder 27 extends forward of the shaft 7 and there has a hexagonal socket 29 to receive the inner end of a similarly shaped shank 30 which may have at its outer end a blade 31 for driving screws, or a nut-engaging socket 32 for setting nuts. The manner in which the shank 30 is releasably retained in the socket 29 will be presently described.

The device operates as follows: The operator holding the tool engages the blade 31 in the kerf of a screw or the socket 32 over a nut, depending on which is being driven, and then pushes the tool toward the screw or nut, thereby sliding the spindle 2 along the end portion 8 of the shaft 7 and causing the clutch member 4 to be moved into engagement with the clutch member 10. As the spindle 2 has been previously set in rotation by turning on the motor of the tool, the shaft 7 will be turned by the spindle to set the screw or nut as soon as the clutch teeth 19, 20 take hold. They will remain engaged until the screw or nut becomes set to the desired tension, whereupon the resistance afforded by the tightened screw or nut to further turning will overcome the driving torque of the spindle on the shaft 7 through the clutch members and release the shaft 7 from the full driving torque of the spindle. With the clutch member 10 slidably mounted on the shaft 7, said clutch member will yield against its spring 11 and permit the teeth of the rotating clutch member 4 to slip and ratchet over those on the clutch member 10 and thus momentarily disengage the clutch members as their teeth pass over each other. After the teeth have passed over one another they will again engage and keep up this action until the tool is allowed to go back by the operator, when the clutch members will again assume their fully open or disengaged positions. As the teeth re-engage during the ratcheting action, repeated hammer-like blows are imparted to the shaft 7 and thus effect a full tightening of the screw or nut after it has been initially set. By adjusting the tension of the spring 11, the time that the shaft 7 becomes released from the driving torque of the spindle 2 may be determined and thus regulate the desired tension at which the screws or nuts are to be set. With the clutch member 10 held by the spring 23 against the flange 26 of the guard when the clutch members are disengaged, the shaft 7 will not rotate with the spindle 2 and thus may be grasped by the operator and be turned in any direction to set the outer end of the shank 30 for proper engagement with the nut or screw, as the case may be. Moreover, the outer end of the shank will not mar the work when applied thereto as it is not in rotation at that time.

To releasably hold the shank 30 in the socket 29, the shank is provided adjacent its inner end with a surrounding groove 33. This groove is designed to receive the inner portions of a set of ball checks 34, 34, which are carried by the holder 27 in suitable holes 35, 35. Slidably mounted over the outer end of the holder 27 is a sleeve 36 which has an interior flange 37 to force and hold the ball checks 34 in the groove 33 of the shank when the latter has been inserted to its full extent in the socket 29. A coiled spring 38 encircles the forward end of the holder 27 between the same and the sleeve 36 and bears against the flange 37 to normally hold it in a position over the ball checks 34, as shown in Fig. 1, and thus lock the shank 30 in the socket. The outer end of this spring bears against a flange 39 at the outer end of the holder 27 and thus is prevented from slipping off of the holder.

To release the shank from the socket, the sleeve 36 is pulled forward compressing the spring and carrying the flange 37 forward of the ball checks 34. These are then free to be forced outward into a recess 40 at the inner end of the sleeve by merely pulling the shank 30 out of the socket, as shown in Fig. 4. On releasing the sleeve 36, the spring returns it back to its normal position with the flange 37 over the ball checks and the latter are held with their lower ends projecting into the socket 29. The inner ends of the holes 35 are extended slightly inward so as to prevent the ball checks from dropping any further into the socket. On inserting a shank 30 into the socket, the sleeve 36 is first drawn forward so as to release the flange 37 from the ball checks, and when the shank is fully in the socket, the groove 33 is in register with the ball checks and the sleeve on being released will move back into its normal position and hold the ball checks in this groove and thus lock the shank in the socket. This releasable lock for the shank is quite simple in construction and operation, is very effective, and moreover provides a quick release of the shank and permits either a screw driving or a nut driving shank to be interchangeably used with the socket.

The device shown and described is simpler in construction than the three clutch member arrangement as heretofore referred to, and is shorter by the elimination of one of the clutch members. Consequently, the device is less expensive, as only two clutch members are required in place of three as in the other arrangement. While the device is shown in the form of an attachment for drill spindles, it may be made permanent therewith in tools which are designed especially for nut or screw driving. The ball keys 13 reduce friction and permit easy sliding of the clutch member 10 on the shaft 7.

The details of construction and arrangement of parts may be variously changed and modified without departing from the spirit and scope of my invention.

I claim as my invention:

1. In a portable power driven rotary tool, the combination with the rotary spindle of the tool, of a screw or nut driving shaft having its inner end slidably and rotatably mounted in said spindle, a pair of opposed jaw clutch members, one fixed on the spindle and the other slidable on the shaft for rotation therewith, spring means acting on the spindle and shaft for normally holding the clutch members disengaged, a shoulder on the shaft between the clutch members, and a spring about the shaft and engaging the slidable clutch member thereon for normally holding the same against said shoulder.

2. In a portable power driven rotary tool, the combination with the rotary spindle of the tool, of a screw or nut driving shaft having its inner end slidably and rotatably supported by the spindle, a pair of opposed jaw clutch members on the spindle and shaft, respectively, and rotatable therewith, ball keys slidably connecting the clutch member on the shaft with the same, spring means acting on the spindle and shaft for normally holding the clutch members disengaged, a shoulder on the shaft between said clutch members, a spring about the shaft and engaging the slidable clutch member thereon for normally holding the same against said shoulder, and a nut on the shaft for adjusting the tension of the spring.

3. In a portable power driven rotary tool, the combination with the rotary spindle of the tool, of a screw or nut driving device having a shaft having its inner end slidably and rotatably mounted in said spindle, a pair of opposed annular jaw clutch members, one fixed on the spindle and the other slidable on the shaft but rotatable therewith, spring means acting on the spindle and shaft for normally holding the clutch members disengaged, means permitting the slidable clutch member to yield to release the shaft from the driving torque of the spindle when the screw or nut becomes set, and means holding the slidable clutch member from being rotated by the spindle when the clutch members are disengaged.

4. In a portable power driven rotary tool, the combination with the rotary spindle of the tool, of a screw or nut driving device having a shaft having its inner end slidably and rotatably mounted in said spindle, a pair of opposed annular jaw clutch members, one fixed on the spindle and the other slidable on the shaft, a sleeve secured to the casing of the tool and housing the clutch members, said sleeve having an inturned flange at its outer end to be engaged by the clutch member on the shaft, spring means acting on the shaft and spindle for normally holding the clutch members disengaged and at the same time pressing the clutch member on the shaft against said flange, and a spring about the shaft beyond the sleeve for engaging the slidable clutch member and permitting it to yield to release the shaft from the driving torque of the spindle when the screw or nut driven by said shaft becomes set.

5. In a portable power driven rotary tool, the combination with the rotary spindle of the tool, of a screw or nut driving device having a shaft associated with said spindle, a pair of opposed annular jaw clutch members movable toward and from each other and constituting the driving and the only clutch device between the shaft and the spindle; one clutch member being fixed on the spindle and the other clutch member being slidable on the shaft but rotatable therewith, and spring means permitting the slidable clutch member to yield to release the shaft from the driving torque of the spindle as soon as the screw or nut being driven by said shaft becomes set, the jaws on the respective clutch members having wide spaces between them so that plenty of time is allowed for the jaws to take hold on moving the clutch members into engagement.

6. In a portable power driven rotary tool, the combination with the rotary spindle of the tool, of a screw or nut driving device having a shaft slidably and rotatably supported by the spindle, a pair of opposed annular jaw clutch members mounted on the shaft and the spindle, respectively, for rotation therewith and constituting the driving and the only clutch device between the shaft and the spindle, spring means urging the shaft outward from the spindle to separate the clutch members on withdrawing the tool from the work but permitting the clutch members to engage on pressing the tool against the work, and means permitting one clutch member to yield with respect to the other clutch member to release the shaft from the full driving torgue of the spindle as soon as the screw or nut becomes set.

7. In a portable power driven rotary tool, the combination with the rotary spindle of the tool, of a screw or nut driving device having a shaft slidably and rotatably supported by the spindle, a pair of opposed annular jaw clutch members on the shaft and the spindle, respectively, for rotation therewith and constituting the driving and the only clutch device between the shaft and the spindle, spring means urging the shaft outward from the spindle to separate the clutch members on withdrawing the tool from the work but permitting the clutch members to engage on pressing the tool against the work, a spring permitting one clutch member to yield with respect to the other clutch member to release the shaft from the full driving torque of the spindle as soon as the screw or nut becomes set, and means for adjusting the tension of said spring.

8. In a portable power driven rotary tool, the combination with the rotary spindle of the tool, of a screw or nut driving device having a shaft slidably and rotably supported by the spindle, a pair of opposed annular jaw clutch members mounted on the shaft and the spindle, respectively, and constituting the driving and the only clutch device between the shaft and the spindle, one clutch member being fixed on the spindle and the other clutch member being slidably mounted on the shaft but rotatable therewith, spring means urging the shaft outward from the spindle to separate the clutch members on withdrawing the tool from the work but permitting the clutch members to engage on pressing the tool against the work, and a coiled spring about the shaft on the outer side of the slidable clutch member to permit the latter to yield with respect to the other clutch member as soon as the screw or nut becomes set.

In testimony whereof I affix my signature.

AXEL LEVEDAHL.